(12) United States Patent
Free

(10) Patent No.: US 9,186,294 B1
(45) Date of Patent: Nov. 17, 2015

(54) BACK SCRATCHER MOUNTING SYSTEM

(76) Inventor: Arnold Free, Oneida, TN (US)

( * ) Notice: Subject to any disclaimer, the term of this patent is extended or adjusted under 35 U.S.C. 154(b) by 559 days.

(21) Appl. No.: 12/985,045

(22) Filed: Jan. 5, 2011

(51) Int. Cl.
*A61H 7/00* (2006.01)
*F16B 21/00* (2006.01)

(52) U.S. Cl.
CPC ............... *A61H 7/002* (2013.01); *F16B 21/00* (2013.01); *A61H 2201/0123* (2013.01); *A61H 2201/0126* (2013.01); *A61H 2201/1623* (2013.01); *A61H 2203/0406* (2013.01); *A61H 2205/081* (2013.01)

(58) Field of Classification Search
CPC ......... A61H 7/00; A61H 7/002; A61H 7/007; A61H 2201/0123; A61H 2201/0126; A61H 2201/0161; A61H 2201/1623; A61H 2201/1693; A61H 2205/081; A61H 2203/0406; F16B 21/00
USPC ........... 601/134, 136, 137, 138; 4/559, 575.1, 4/581, 606; 15/106, 110, 114, 117, 160, 15/188, 210.1, 244.1, 244.3, 244.4; 248/219.1, 219.4, 218.4, 228.4, 230.4
See application file for complete search history.

(56) References Cited

U.S. PATENT DOCUMENTS

| | | | |
|---|---|---|---|
| 3,797,792 A * | 3/1974 | Huber ...................... 248/229.26 |
| 5,228,165 A | 7/1993 | Westberry et al. |
| D351,505 S | 10/1994 | Mastellone |
| 5,774,907 A | 7/1998 | Doggwiler |
| D403,119 S | 12/1998 | Vazquez |
| 5,983,433 A * | 11/1999 | Chapman .......................... 4/606 |
| 6,110,132 A * | 8/2000 | Kurpieski ..................... 601/136 |
| 7,087,004 B1 | 8/2006 | Berke |
| 7,500,282 B1 | 3/2009 | Park |
| 2003/0079319 A1 * | 5/2003 | McAllister ...................... 24/536 |
| 2003/0144618 A1 | 7/2003 | Harmon et al. |
| 2006/0197000 A1 * | 9/2006 | Meltzer ...................... 248/219.4 |
| 2009/0088672 A1 | 4/2009 | Vaughan et al. |
| 2011/0166481 A1 * | 7/2011 | Rhoad et al. .................. 601/136 |

* cited by examiner

*Primary Examiner* — Quang D Thanh
(74) *Attorney, Agent, or Firm* — Luedeka Neely Group, PC

(57) ABSTRACT

A back scratching device is disclosed including a frame body and a back scratching pad. The frame body is operable to be removeably mounted to a wall surface and includes a base having a first end and a second end, a first flex mechanism attached to the first end of the base, the first flex mechanism operable to be flexed outward from the first end of the base from a resting position to a wall clearing position, and a second flex mechanism attached to the second end of the base, the second flex mechanism operable to be flexed outward from the second end of the base from a resting position to a wall clearing position. The first and second flex mechanisms are each operable to move from the wall clearing position to a clutching position for mounting the frame body to the wall surface. The back scratching pad is attached to the base of the frame body and includes an abrasive contact surface.

6 Claims, 4 Drawing Sheets

BACK SCRATCHER MOUNTING SYSTEM

FIELD

This invention relates to the field of back scratching devices. More particularly, this invention relates to a back scratching device that may be removeably attached to a wall structure.

BACKGROUND

A variety of back scratching devices have been known in the art. Many back scratching devices are hand-held and have long handles that enable a user to scratch hard to reach areas of their backs. Alternatively, some back scratching devices are attached to wall surfaces using various attachment mechanisms such as screws, adhesive strips, and suction cups. However, more permanent fasteners such as screws and adhesive strips can cause damage to the wall surface and are not easily portable and unable to be used in a variety of locations around the house. Further, back scratching devices using suction cups are generally only able to be used in bathrooms where the wall surface is very smooth (e.g., glass or tile), and the device is generally ineffective as it is easily removed from the wall surface during use. What is needed is a hands free back scratching device that is easily and securely mounted to a wall surface without causing damage to the wall surface.

SUMMARY OF THE INVENTION

According to one embodiment of the invention, a back scratching device is disclosed including a frame body and a back scratching pad. The frame body is operable to be removeably mounted to a wall surface and includes a base having a first end and a second end, a first flex mechanism attached to the first end of the base, the first flex mechanism operable to be flexed outward from the first end of the base from a resting position to a wall clearing position, and a second flex mechanism attached to the second end of the base, the second flex mechanism operable to be flexed outward from the second end of the base from a resting position to a wall clearing position. The first and second flex mechanisms are each operable to move from the wall clearing position to a clutching position for mounting the frame body to the wall surface. The back scratching pad is attached to the base of the frame body and includes an abrasive contact surface.

In some embodiments of the invention, the back scratching pad is removeably attached to the base of the frame body. The base of the frame body may include a slot and at least a portion of the back scratching pad is operable to be inserted into the slot for removeably attaching the back scratching pad to the base. The back scratching device may also include a second back scratching pad operable to be removeably attached to the base, the second back scratching having a second abrasive contact surface different than the abrasive contact surface of the back scratching pad.

According to some embodiments of the invention, the frame body is operable to be attached to the wall surface adjacent a door jamb. The first and second flex mechanism may each include a wall contacting surface, the wall contacting surface of the first flex mechanism being operable to apply pressure to a first side of the wall surface when the first flex mechanism is in the clutching position and the wall contacting surface of the second flex mechanism being operable to apply pressure to a second side of the wall surface when the second flex mechanism is in the clutching position. The wall contacting surfaces of the first and second flex mechanism each may also include a pressure absorbing pad. The first and second flex mechanisms may be wing shaped.

In another embodiment, the back scratching device includes a frame body operable to be removeably mounted to a wall surface having a first side and a second side. The frame body includes a base having a first end and a second end, a first attachment arm attached to the first end of the base, the first attachment arm operable to apply pressure to the first side of the wall surface when the first attachment arm is in a clutching position, and a second attachment arm attached to the second end of the base, the second attachment arm operable to apply pressure to the second side of the wall surface when the second attachment arm is in a clutching position. At least one of the first and second attachment arms is operable to move from a wall clearing position to the clutching position for mounting the frame body to the wall surface. A back scratching pad attached to the base of the frame body, the back scratching pad including an abrasive contact surface.

In certain embodiments, the second attachment arm is a flex mechanism, and the flex mechanism is operable to be flexed outward from the second end of the base from a resting position to the wall clearing position.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
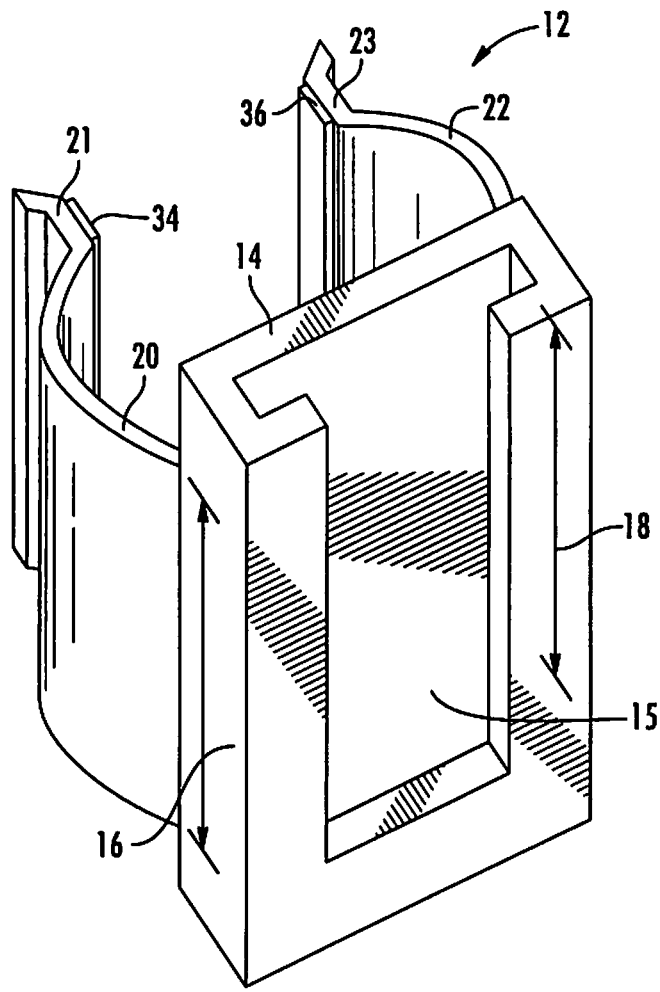
FIG. 1A is a front perspective view of a frame body according to one embodiment of the present invention.
Figure 1B:
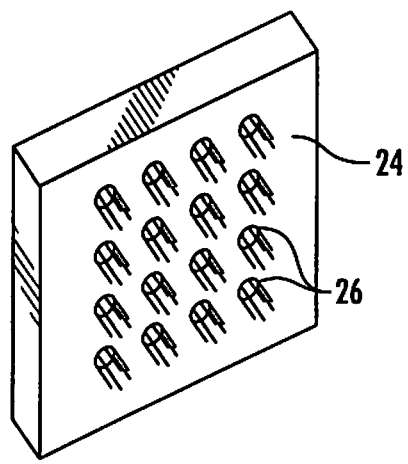
FIG. 1B is a front perspective view of a back scratching pad according to one embodiment of the present invention.

Referring to FIG. 1A-1B, a back scratching device 10 is shown. As shown in FIG. 1A, the back scratching device includes a frame body 12. The frame body 12 includes a base 14 having a first end 16 and a second end 18. A first attachment arm or flex mechanism 20 is attached adjacent the first end of the base 16 and a second attachment arm or flex mechanism 22 is attached adjacent the second end 18 of the base. As shown in FIG. 1A, the flex mechanism 20, 22 may be attached to a rear portion of the base adjacent the first and second ends. In alternate embodiments, the flex mechanisms 20, 22 may be attached directly to the first and second ends 16, 18. Each of the first and second flex mechanisms 20, 22 include a wall contacting surface 21, 23. As shown in FIG. 1B, the back scratching device 10 further includes a back scratching pad 24 operable to be attached to the base 14 of the frame body 12 and having an abrasive contact surface 26. The abrasive contact surface 26 is adapted to scratch a user's back when the user rubs their back against the contact surface 26. The abrasive contact surface 26 may come in a variety of forms including bristles having textures of varying firmness, lengths, covering different ranges of the surface area.

In some embodiments of the invention, the back scratching pad 24 may be permanently attached to the base 14 of the frame body 12. In preferred embodiments, however, the back scratching pad 24 is removable from the base 14 of the frame body 12 for cleaning the pad 24 or replacing the pad 24 with another back scratching pad 24. Thus, a user may select from a variety of pads 24 having particular contact surfaces 26 and interchange the pads 24 so that the user's back scratching experience may be altered. As shown in FIG. 1A, the base 14 may include a slot 15 for receiving the back scratching pad 24, or at least a portion of the pad 24, to secure the particular pad 24 chosen by the user to the frame body 12. However, a variety of mechanisms may be used within the scope of the present invention and known in the art to removeably secure the pad 24 to the base 14 including pins, screws, tongue-and-groove mechanisms, etc. For example, the pad 24 may include a groove attached to a rear surface of the pad 24 for inserting into the slot 15 so as to connect the pad 24 to the base 14 without inserting the entire pad 24 into the slot 15.

While the dimensions of the base 14 of the frame body 12 and back scratching pad 24 may vary in accordance with the present invention, in preferred embodiments the base is about 11 (height)×5⅝ (width)×2 (depth) inches and each removable pad 24 is about 10¾×3¾×1¼ inches. Thus, the width of the slot is preferably slightly more than 3¾ inches. The dimensions of the flex mechanisms 20, 22 may also vary within the scope of the present invention, but the flex mechanisms 20, 22 are preferably about 6-7 inches in height, 4¾-5¼ inches in width, and extend back about 3-5 inches. To enable even greater flex or movement of the flex mechanisms 20, 22, the width of the flex mechanisms may be reduced as shown in FIG. 1A.

Figure 2:
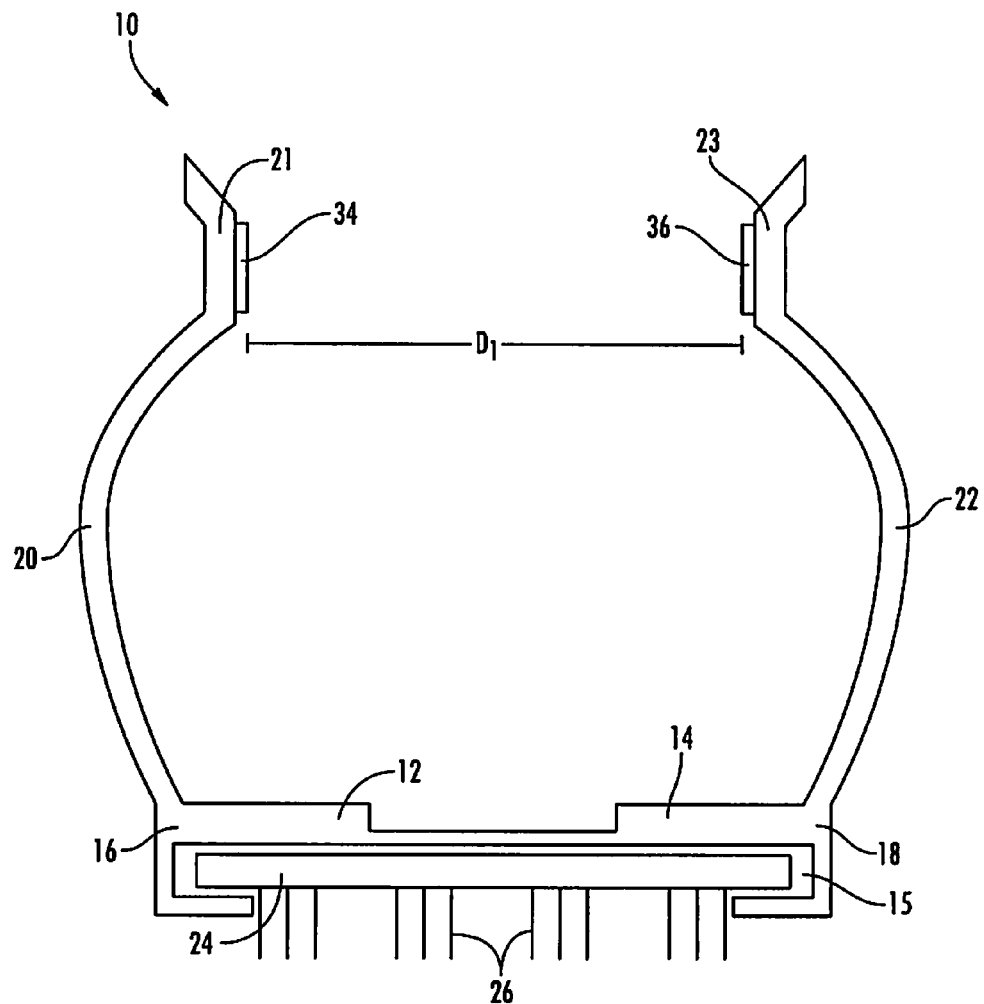
FIG. 2 is a top cross-sectional view of a back scratching device in the resting position according to one embodiment of the present invention.
Figure 3:
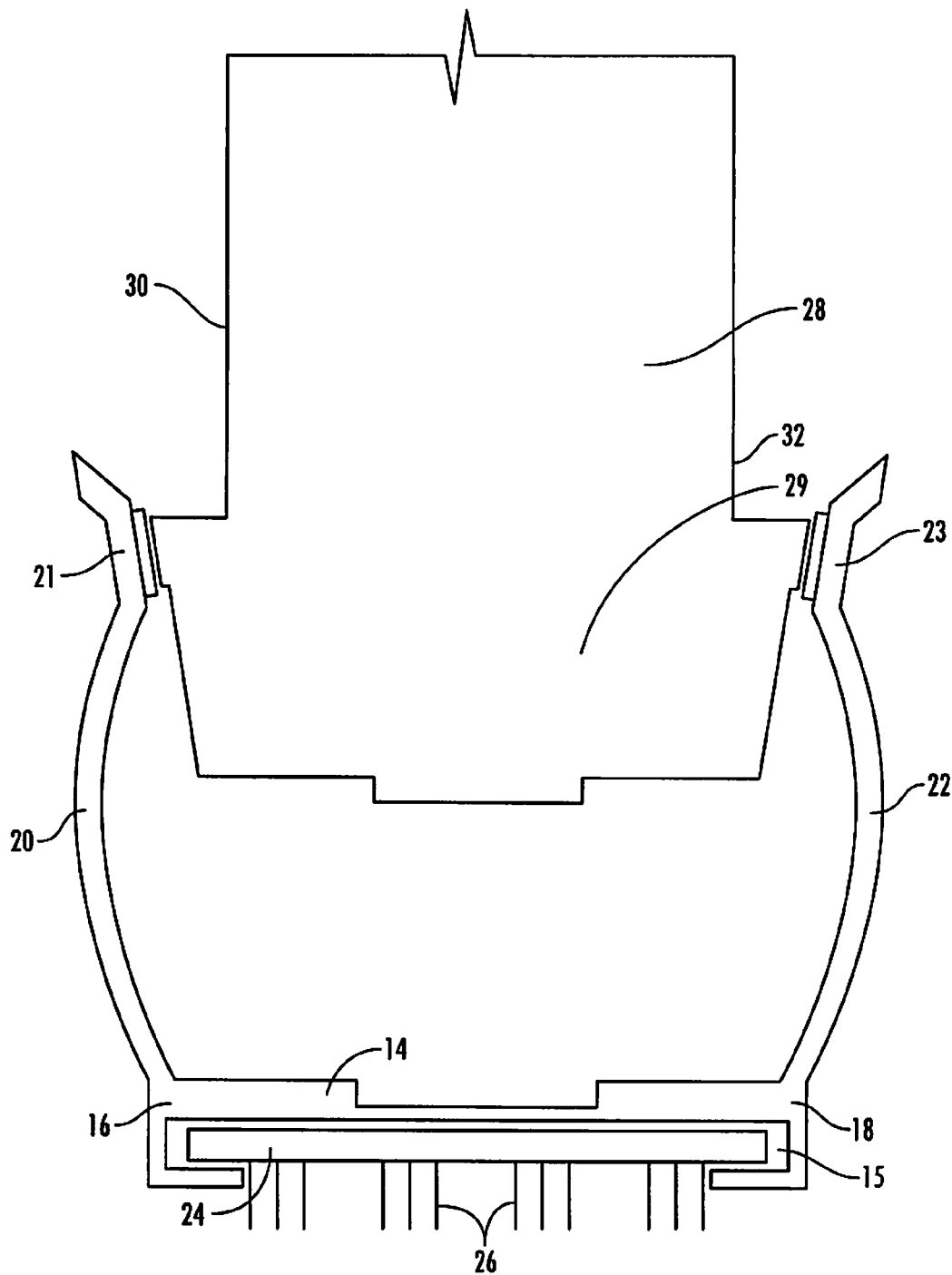
FIG. 3 is a top cross-sectional view of a back scratching device in the wall clearing position according to one embodiment of the present invention.
Figure 4:
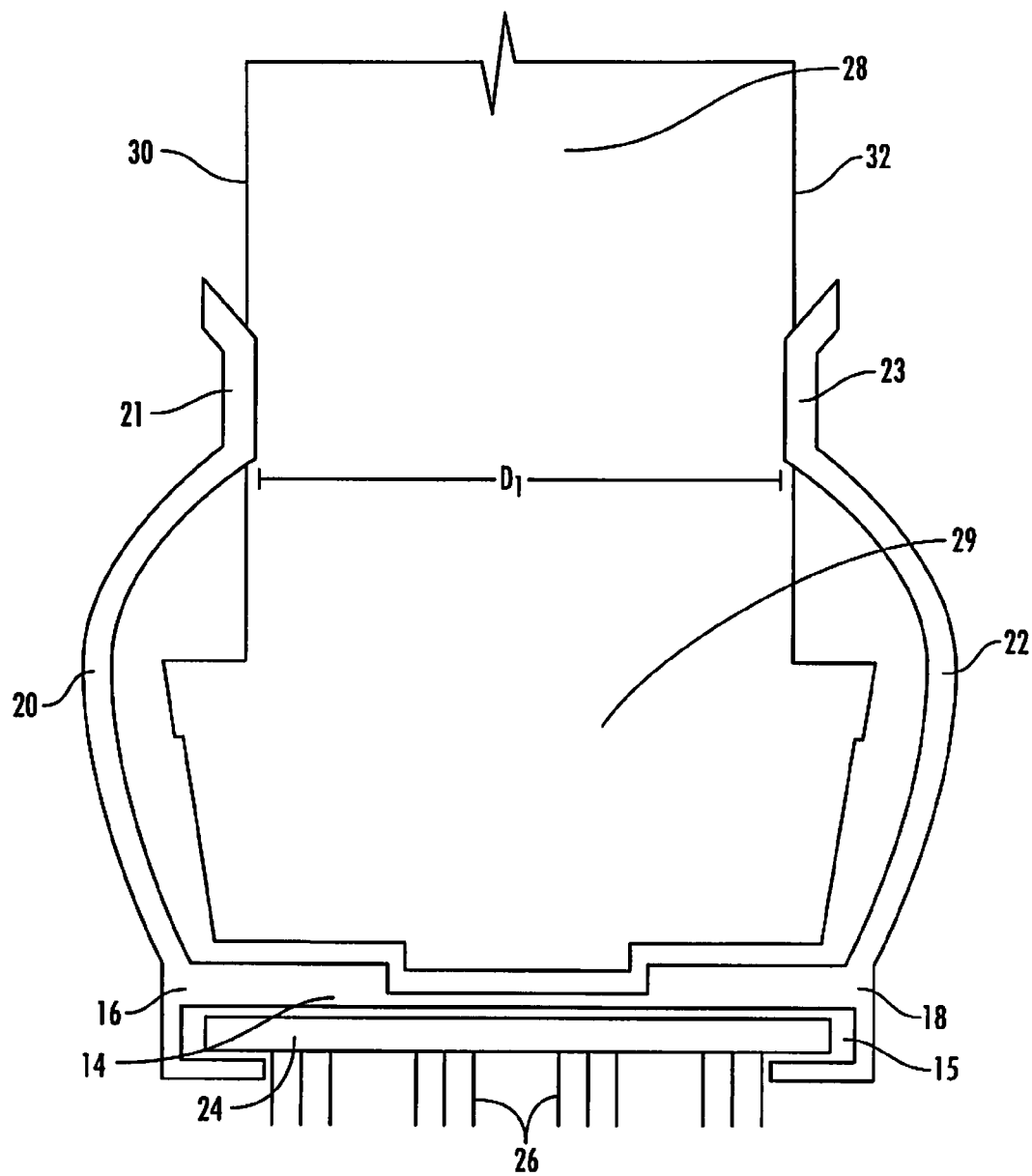
FIG. 4 is a top cross-sectional view of a back scratching device in the clutching position according to one embodiment of the present invention.

Referring to FIGS. 2-4, the flex mechanisms 20, 22 of the back scratching device 10 are shown in a resting position (FIG. 2), a wall clearing position (FIG. 3), and a clutching position (FIG. 4). Referring to FIG. 3, the back scratching device 10 is shown in the process of being mounted to a wall surface 28. In the wall clearing position, the first flex mechanism 20 is operable to be flexed outward with respect to the first end 16 of the base 14 and the second flex mechanism 22 is operable to be flexed outward with respect to the second end 18 of the base 14. The flex mechanisms 20, 22 are flexed outward so that the first flex mechanism 20 is operable to clear a first side 30 of the wall surface 28 and the second flex mechanism 22 is operable to clear a second side 32 of the wall surface 28. As shown in FIG. 3, after positioning the back scratching device 10 in a desired scratching position with respect to the wall surface 28, the flex mechanisms 20, 22 are operable to move from the wall clearing position to a clutching position for mounting the base 14 to the wall surface 28.

In preferred embodiments, the back scratching device 10 is intended to be mounted to a protruding wall surface 28 adjacent a standard door jamb 29. In this embodiment, the distance $D_1$ between the wall contacting surfaces 21, 23 when the first and second flex mechanisms 20, 22 are in the resting position is slightly less than the width of the wall surface 28. As the standard width of a typical door frame is about 4½ inches, the distance between the wall contacting surfaces 21, 23 at the resting position is preferably about 4¾ inches to slightly less than 4½ inches. The flex mechanisms 20, 22 are preferably composed of any type of flexible plastics known in the art so that they may be flexed outward preferably in the range of about ¾ to 1 inch to clear the door jamb 29 in the wall clearing position. Further, in order to assist the flex mechanisms 20, 22 in clearing the door jamb 29, the flex mechanisms are preferably "wing shaped" as shown in FIGS. 2-4.

After being flexed outward to clear the door jamb 29, the flex mechanisms 20, 22 are operable to move from the wall clearing position back to the resting position. However, as the wall surface 28 has a greater width than the distance $D_1$ between the wall contacting surfaces 21, 23 of the flex mechanisms 20, 22 in the resting position, the flex mechanisms 20, 22 are prevented from returning to the resting position. Accordingly, the wall contacting surface 21 of the first flex mechanism 20 applies pressure to the first side 16 of the wall surface 28 and the wall contacting surface 23 of the second flex mechanism 22 applies pressure to the second side 18 of the wall surface 28 when the flex mechanisms 20, 22 are in the clutching position for mounting the frame body to the wall surface 28. In order to prevent the wall contacting surfaces 21, 23 of the flex mechanisms 20, 22 from damaging the wall surface 28, the flex mechanisms 20, 22 may include pressure absorbing pads 34, 36 disposed on the respective wall contacting surfaces 21, 23.

As the flex mechanisms 20, 22 essentially "clamp" the frame body 12 of the back scratching device 10 to the wall surface 28 when the flex mechanisms 20, 22 are in the clutching position, the back scratching device 10 of the present invention is height adjustable merely be changing the desired location of the frame body 12 along the vertical length of the protruding wall 28 and/or door jamb 29.

In other embodiments of the invention, the flex mechanisms as described above may be replaced or used in combination with other types of attachment arms and mechanisms for allowing the frame body to be removeably mounted to the wall surface. For example spring mechanisms may be included adjacent to where the flex mechanisms are attached to the first and second ends of the base. The spring mechanisms are operable to further aid the flex mechanisms to be moved from the resting position to the wall clearing position. In other embodiments, the attachment arms are provided with only limited flex capability, or none at all, and the spring mechanisms are used as substantially the sole basis for moving the attachment arms from the resting position to the wall clearing position and may be removeably locked when the device is in the clutching position. Furthermore, in some embodiments of the invention, only one of the attachment arms may be operable to flex outwardly, and the other attachment arm is substantially stiff. In yet another embodiment, one or more of the attachment arms may be operable to slide horizontally from its respective side of the frame base. Thus, the attachment arm may slide out to clear the side of the wall surface and then slide back and lock in to "clamp" the back scratching device to the wall surface.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A back scratching device comprising:
   a unitary frame body operable to be removeably mounted to a wall having a first wall surface and a second wall surface, the wall having a wall width and the wall being adjacent a door jamb having a door jamb width greater than the wall width, the frame body including:

a base having a first end and a second end, a first flex mechanism attached to the first end of the base and having a first wall contacting surface, the first flex mechanism having a wing-shape so that a middle portion of the first flex mechanism disposed between the first end of the base and the first wall contacting surface curve away from the first end of the base and the first wall contacting surface, the first flex mechanism operable to be flexed outward from the first end of the base from a resting position to a door jamb clearing position, and a second flex mechanism attached to the second end of the base and having a second wall contacting surface, the second flex mechanism having a wing-shape so that a middle portion of the second flex mechanism disposed between the second end of the base and the second wall contacting surface curve away from the second end of the base and the second wall contacting surface, the second flex mechanism operable to be flexed outward from the second end of the base from a resting position to a door jamb clearing position, the first wall contacting surface and the second wall contacting surface of the first and second flex mechanisms being separated by a resting distance that is smaller than the wall width when the flex mechanisms are in the resting positions, and wherein, when the first and second flex mechanisms are flexed outward to the door jamb clearing positions, the first wall contacting surface and the second wall contacting surface are separated by a clearing distance that is greater than the door jamb width for allowing the first and second wall contacting surfaces to pass the door jamb, and wherein, when the first and second flex mechanisms are released from their door jamb clearing positions after the first and second wall contacting surfaces are past the door jamb, the first and second wall contacting surfaces are operable to flex inward towards their resting positions until the first wall contacting surface is pressed against the first wall surface and the second wall contacting surface is pressed against the second wall surface for securing the frame body to the wall in a clutching position, wherein the wing-shape of the first and second flex mechanisms is operable to provide empty space between the door jamb and the middle portions of the first and second flex mechanisms when the first and second flex mechanism are in the clutching position; and a back scratching pad attached to the base of the frame body, the back scratching pad including an abrasive contact surface.

2. The back scratching device of claim 1 wherein the back scratching pad is removeably attached to the base of the frame body.

3. The back scratching device of claim 2 wherein the base of the frame body includes a slot and at least a portion of the back scratching pad is operable to be inserted into the slot for removeably attaching the back scratching pad to the base.

4. The back scratching device of claim 2 further comprising a second back scratching pad operable to be removeably attached to the base, the second back scratching having a second abrasive contact surface different than the abrasive contact surface of the back scratching pad.

5. The back scratching device of claim 1 wherein the wall contacting surfaces of the first and second flex mechanism each include a pressure absorbing pad.

6. The back scratching device of claim 1 wherein the wall contacting surfaces of the first and second flex mechanisms are operable to flexed outwardly greater than about 0.75 inches in the door jamb clearing position with respect to the resting position.

* * * * *